(12) United States Patent  
Krause

(10) Patent No.: US 9,094,129 B2  
(45) Date of Patent: Jul. 28, 2015

(54) DUAL-DRIVE MODULATOR

(71) Applicant: Infinera Corporation, Sunnyvale, CA (US)

(72) Inventor: David James Krause, Nepean (CA)

(73) Assignee: Infinera Corporation, Sunnyvale, CA (US)

(*) Notice: Subject to any disclaimer, the term of this patent is extended or adjusted under 35 U.S.C. 154(b) by 130 days.

(21) Appl. No.: 13/630,831

(22) Filed: Sep. 28, 2012

(65) Prior Publication Data

US 2014/0093253 A1  Apr. 3, 2014

(51) Int. Cl.
 *H04B 10/50* (2013.01)
 *H04B 10/516* (2013.01)
 *H04B 10/588* (2013.01)

(52) U.S. Cl.
 CPC .......... *H04B 10/516* (2013.01); *H04B 10/5053* (2013.01); *H04B 10/588* (2013.01)

(58) Field of Classification Search
 CPC .............. H04B 10/58–10/588; H04B 10/5053; H04B 10/5055
 USPC .................. 398/182, 192–194, 200
 See application file for complete search history.

(56) References Cited

U.S. PATENT DOCUMENTS

| 2007/0274731 A1* | 11/2007 | Boffi et al. ..................... 398/188 |
| 2011/0176813 A1* | 7/2011 | Kim et al. ...................... 398/147 |
| 2012/0093510 A1* | 4/2012 | Zhang et al. ..................... 398/65 |
| 2012/0148232 A1* | 6/2012 | Kim et al. ....................... 398/25 |
| 2013/0070785 A1* | 3/2013 | Liu et al. ........................ 370/464 |

OTHER PUBLICATIONS

McNicol et al., "Electrical Domain Compensation of Optical Dispersion", Optical Fiber Communications Conference, 2005, OThJ3, 3 pages.
K. P. Ho, "Generation of Arbitrary Quadrature Signals Using One Dual-Drive Modulator"; Journal of Lightwave Technology, vol. 23, No. 2, Feb. 2005, 7 pages.
R. Killey et al., "Electronic Dispersion Compensation by Signal Predistortion Using a Dual-Drive Mach-Zehnder Modulator", OFC 2005, OThJ2, 3 pages.
Krause et al., "Demonstration of 20-Gb/s DQPSK with a Single Dual-Drive Mach-Zehnder Modulator", IEEE Photonics Technology Letters, vol. 20, No. 16, Aug. 15, 2008, 3 pages.
Nakamura et al., "Experimental Demonstration of 16-QAM Transmission with a Single Dual-Drive Mach-Zehnder Modulator", OSA/OFC/NFOEC 2011, 3 pages.
Shibata et al., "Demonstration of 112-Gbit/s DP-QPSK Modulation Using InP n-p-i-n Mach-Zehnder Modulators", ECOC 2010, Sep. 19-23, 2010, Torino, Italy, 3 pages.

* cited by examiner

*Primary Examiner* — David Payne
*Assistant Examiner* — Casey Kretzer
(74) *Attorney, Agent, or Firm* — Harrity & Harrity LLP; David L. Soltz

(57) ABSTRACT

A transmitter module includes a processor configured to receive input data, and determine input values corresponding to the input data; a digital-to-analog converter configured to receive the input values from the processor, and generate first and second voltage signals based on the input values; a laser configured to output light; a Mach-Zehnder modulator configured to receive the light from the laser and the first and second voltage signals from the digital-to-analog converter, and modulate the light based on the first and second voltage signals to generate a modulated optical signal that includes distortion; and a filter configured to receive the modulated optical signal from the modulator, process the modulated optical signal to reduce or eliminate the distortion and produce an output optical signal, and output the output optical signal.

12 Claims, 15 Drawing Sheets

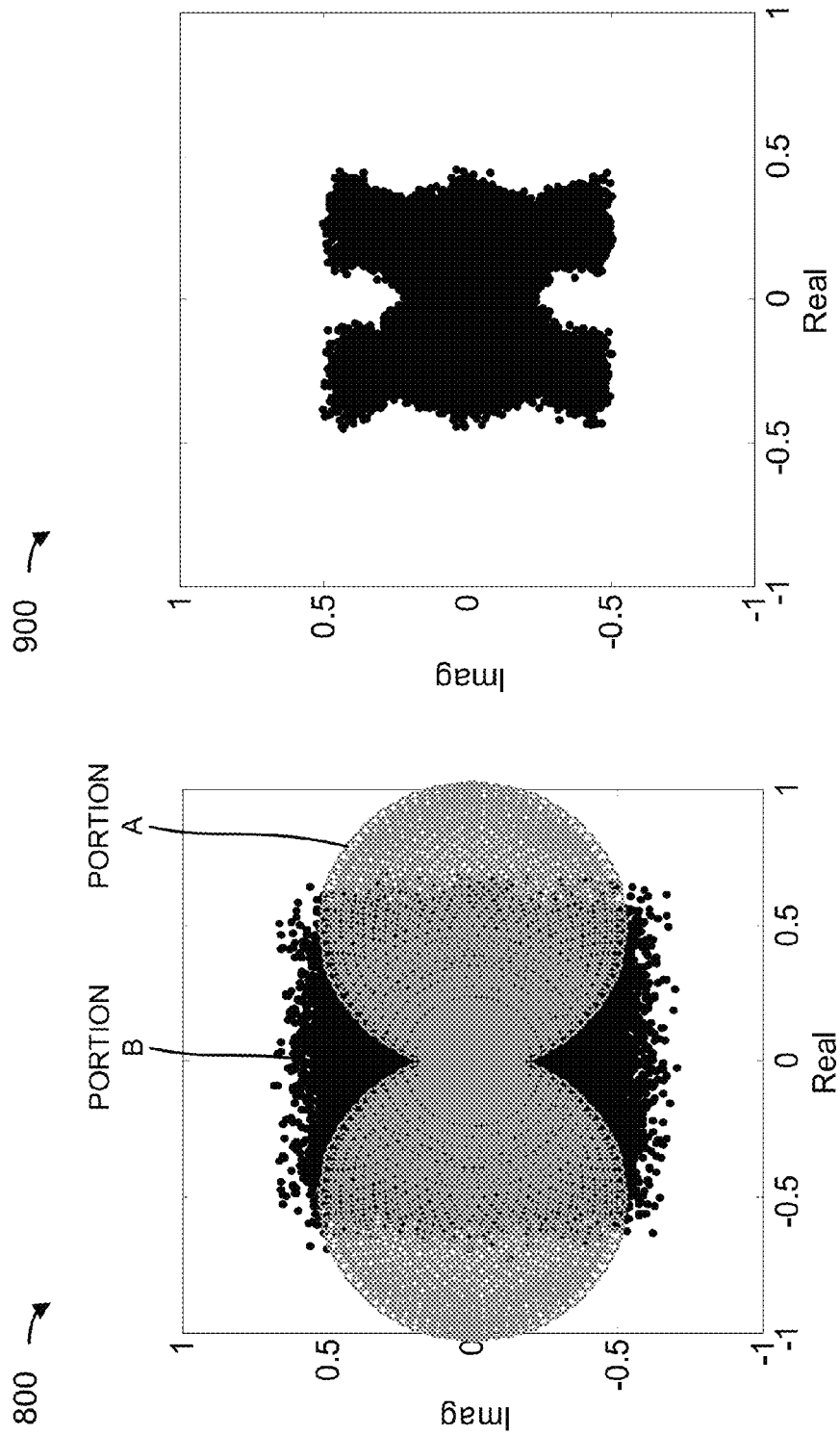

DUAL-DRIVE MODULATOR

BACKGROUND

Wavelength division multiplexed (WDM) optical communication systems (referred to as "WDM systems") are systems in which multiple optical signals, each having a different wavelength, are combined into a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, or various polymers and semiconductor materials which are used to make semiconductor lasers, such as GaAs and InP.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs. The spacing, between the channels, may be less than 200 GHz, in order to tightly pack the channels together to form a super-channel.

SUMMARY

According to some example implementations, an optical system may include a transmitter module. The transmitter module may include a processor, a digital-to-analog converter, a laser, a Mach-Zehnder modulator, and a filter. The processor is configured to receive input data, and determine input values corresponding to the input data. The digital-to-analog converter is configured to receive the input values from the processor, and generate first and second voltage signals based on the input values. The laser is configured to output light. The modulator is configured to receive the light from the laser and the first and second voltage signals from the digital-to-analog converter, and modulate the light based on the first and second voltage signals to generate a modulated optical signal that includes distortion. The filter is configured to receive the modulated optical signal from the modulator, process the modulated optical signal to reduce or eliminate the distortion and produce an output optical signal, and output the output optical signal.

According to some example implementations, a transmitter module may include a processor, a first digital-to-analog converter, a second digital-to-analog converter, a first Mach-Zehnder modulator, a second Mach-Zehnder modulator, and a combiner. The processor is configured to receive input data, and determine a first set of input values and a second set of input values corresponding to the input data. The first digital-to-analog converter is configured to receive the first set of input values from the processor, and generate first and second voltage signals based on the first set of input values. The second digital-to-analog converter is configured to receive the second set of input values from the processor, and generate third and fourth voltage signals based on the second set of input values. The first Mach-Zehnder modulator is configured to receive first light and the first and voltage signals from the first digital-to-analog converter, and modulate the first light based on the first and second voltage signals to generate a first modulated optical signal that includes distortion. The second Mach-Zehnder modulator is configured to receive second light and the third and fourth voltage signals from the second digital-to-analog converter, and modulate the second light based on the third and fourth voltage signals to generate a second modulated optical signal that includes distortion. The combiner is configured to receive the first modulated optical signal and the second modulated optical signal, combine the first modulated optical signal and the second modulated optical signal while reducing or eliminating the distortion to produce an output optical signal, and output the output optical signal.

According to some example implementations, a transmitter module may include a group of transmitter components, a first combiner, a second combiner, and a third combiner. The transmitter components are configured to produce a set of first modulated signals and a set of second modulated signals. The first combiner is configured to receive the first modulated signals and combine the first modulated signals into a first combined signal. The second combiner is configured to receive the set of second modulated signals and combine the second modulated signals into a second combined signal. The third combiner is configured to combine the first combined signal and the second combined signal into an output optical signal and output the output optical signal. One of the transmitter components may include a processor, a first digital-to-analog converter, a second digital-to-analog converter, a first Mach-Zehnder modulator, and a second Mach-Zehnder modulator. The processor is configured to receive input data, and determine a first set of input values and a second set of input values corresponding to the input data. The first digital-to-analog converter is configured to receive the first set of input values from the processor, and generate first and second voltage signals based on the first set of input values. The second digital-to-analog converter is configured to receive the second set of input values from the processor, and generate third and fourth voltage signals based on the second set of input values. The first Mach-Zehnder modulator is configured to receive first light and the first and voltage signals from the first digital-to-analog converter, and modulate the first light based on the first and second voltage signals to produce one of the first modulated signals that includes distortion. The second Mach-Zehnder modulator is configured to receive second light and the third and fourth voltage signals from the second digital-to-analog converter, and modulate the second light based on the third and fourth voltage signals to produce one of the second modulated signals that includes distortion. The first combiner is further configured to reduce or eliminate the distortion from the one of the first modulated signals. The second combiner is further configured to reduce or eliminate the distortion from the one of the second modulated signals.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 8 shows an example of another graph illustrating an accessible portion of the complex plane;

FIG. 9 shows an example of a further graph illustrating an accessible portion of the complex plane;

DETAILED DESCRIPTION

The following detailed description refers to the accompanying drawings. The same reference numbers in different drawings may identify the same or similar elements. Also, the following detailed description does not limit the disclosure.

In order to reduce complexity in optical transmitters, a dual-drive Mach-Zehnder modulator structure can be employed to generate Quadrature-Phase Shift Keying (QPSK) and general Quadrature Amplitude Shift Keying (QAM) signals when driven by a digital-to-analog converter (DAC). The dual-drive Mach-Zehnder modulator structure may reduce the quantity of waveguides needed and hence may reduce the quantity of electrical drive signals. In the context of wavelength division multiplexed (WDM) super-channel networks, optical filtering may be used to bring together different channels. The optical filtering may remove some of the distortion caused by the dual-drive Mach-Zehnder modulator structure leaving only a small loss in performance relative to typical optical modulator structures, such as nested Mach-Zehnder modulator structures, used in practice.

Figure 1:
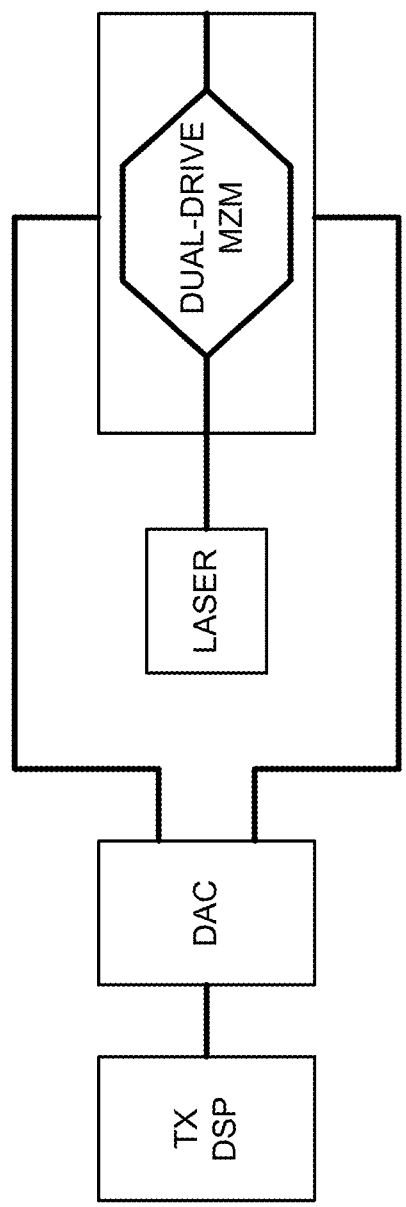
FIG. 1 is a diagram illustrating an overview of an example implementation described herein.

FIG. 1 is a diagram illustrating an overview of an example implementation described herein. As shown in FIG. 1, a transmitter structure may include a transmitter (TX) digital signal processor (DSP), a DAC, a laser, and a dual-drive Mach-Zehnder modulator (MZM). Generally, the TX DSP may receive input data and process the input data to determine what analog voltages need to be applied to the modulator to achieve the desired optical signal. The TX DSP may also perform some pulse shaping, where each one and zero, in the input data, would correspond to some pulse as a function of time. The TX DSP may provide the appropriate integers to the DAC and the DAC may generate the voltage signals to provide to the modulator. The modulator may receive light from the laser, split the light into two portions of light, and modulate each of the portions of light based on the voltage signals received from the DAC. The modulator may then combine the modulated portions of light and output the resulting optical signal.

Such a transmitter structure may be simpler in that the transmitter structure may contain fewer components than existing transmitters. Fewer components may lead to a reduction in the size and complexity of a photonic integrated circuit on which the transmitter structure is located. This may make the photonic integrated circuit cheaper to build and may improve the dependability of the photonic integrated circuit.

With the simpler transmitter structure, the electrical signals needed, to generate the voltage signals applied to the modulator, may become more complicated. For example, rather than just having electrical voltage signals that go high and low, a transmitter, as described herein, may include a DAC that runs at a very high speed (e.g., 64 GSample/s and beyond). As a result, the transmitter may generate a whole continuum of voltage signals between two particular voltage levels, and be able to apply those voltage signals to the modulator. Thus, the DAC may produce these more complicated voltage signals, which may enable a simpler optical layout.

Figure 2:
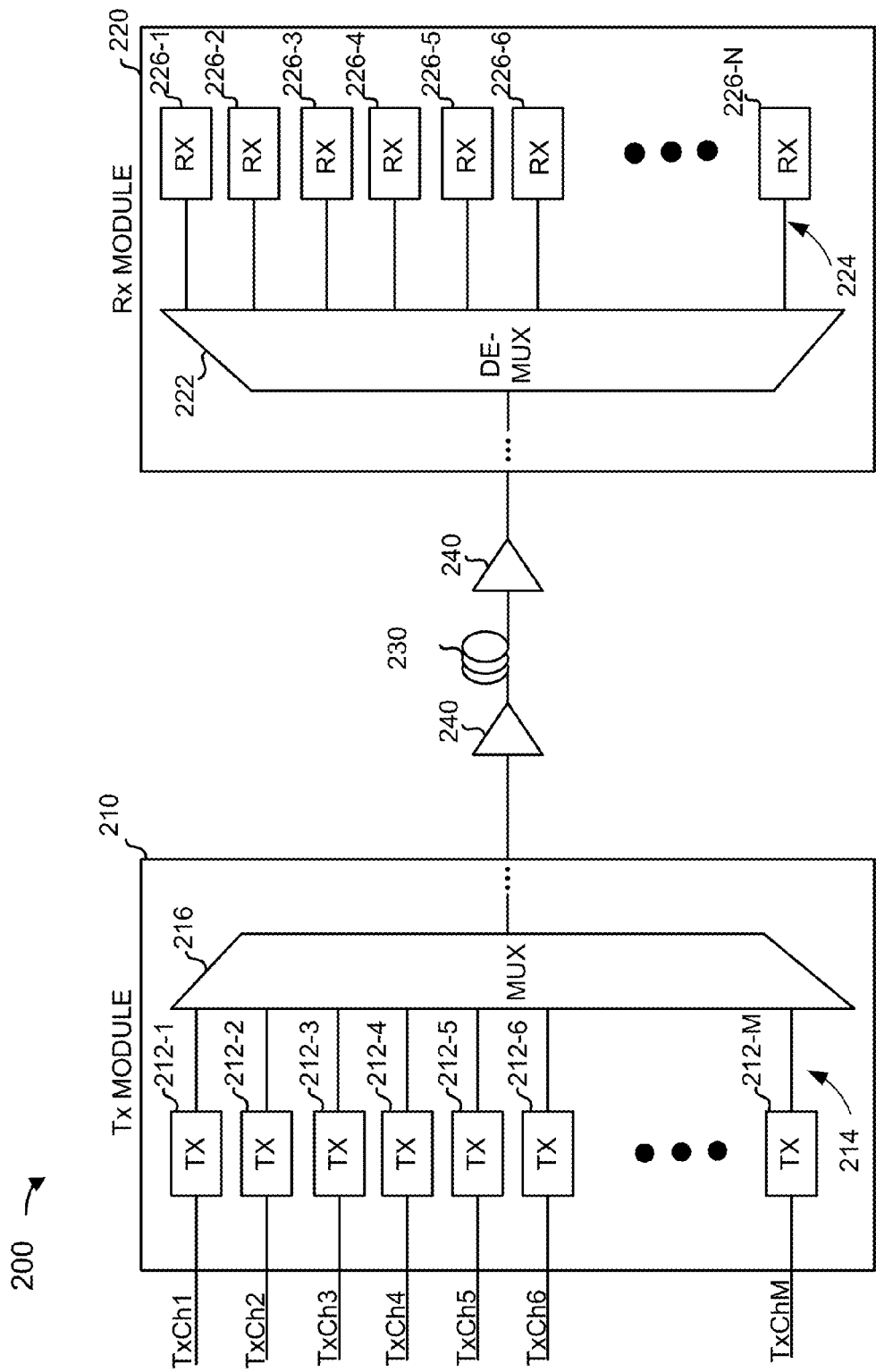
FIG. 2 is a diagram of an example network in which systems and/or methods, described herein, may be implemented.

FIG. 2 is a diagram of an example network 200 in which systems and/or methods described herein may be implemented. As illustrated in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components.

Each optical transmitter 212 may receive data for a data channel (shown as TxCh1 through TxChM), modulate the data with an optical signal to create an output optical signal, and transmit the output optical signal. In one implementation, transmitter module 210 may include 5, 10, 20, 50, 100, or some other quantity of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super-channel.

In some implementations and as described above, each of optical transmitters 212 may include a TX DSP, a DAC, a laser, a modulator, a filter, and/or some other components. The laser and/or the modulator may be coupled with a tuning element that can be used to tune the wavelength of the optical signal channel.

Waveguides 214 may include an optical link or some other link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexer device. In some implementations, optical multiplexer 216 may combine multiple output optical signals, associated with optical transmitters 212, into a single optical signal (e.g., a WDM signal). In some implementations, optical multiplexer 216 may combine multiple output optical signals, associated with optical transmitters 212, in such a way as to produce a polarization diverse signal (e.g., also referred to herein as a WDM signal). A corresponding waveguide may output the WDM signal to an optical fiber, such as link 230. For example, optical multiplexer 216 may include an input (e.g., a first slab to receive input optical signals supplied by optical transmitters 212) and an output (e.g., a second slab to supply a single WDM signal associated with the input optical signals). Optical multiplexer 216 may also include waveguides connected to the input and the output.

In some implementations, the first slab and the second slab may each act as an input and an output. For example, the first slab and the second slab may each receive multiple input optical signals (e.g., output optical signals supplied by optical transmitters 212). Additionally, the first slab may supply a single WDM signal corresponding to the input optical signals (e.g., output optical signals supplied by optical transmitters 212) received by the second slab. Further, the second slab may supply a single WDM signal corresponding to the input optical signals (e.g., output optical signals supplied by optical transmitters 212) received by the first slab. In some implementations, a corresponding waveguide may output the WDM signal to an optical fiber, such as link 230.

As shown in FIG. 2, optical multiplexer 216 may receive output optical signals outputted by optical transmitters 212, and output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier or a Raman amplifier. Amplifier 240 may amplify the optical signals as the optical signals are transmitted via link 230.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other demultiplexer device. Optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the first slab and the second slab.

In some implementations, the first slab and the second slab may each act as an input and an output. For example, the first slab and the second slab may each receive an optical signal (e.g., a WDM signal supplied by optical multiplexer 216 and/or some other optical signal). Additionally, the first slab may supply output optical signals corresponding to the optical signal received by the second slab. Further, the second slab may supply output optical signals corresponding to the optical signal received by the first slab. As shown in FIG. 2, optical demultiplexer 222 may supply optical signals to optical receivers 226 via waveguides 224.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, convert data, associated with the input optical signals, to voltage signals, convert the voltage signals to digital samples, and process the digital samples to produce output data corresponding to the input optical signals. Optical receivers 226 may each operate to convert the input optical signal to an electrical signal that represents the transmitted data. In some implementations and as described above, each of optical receivers 226 may include a local oscillator, a hybrid mixer, a detector, an analog-to-digital converter (ADC), an RX DSP, and/or some other components.

While FIG. 2 shows network 200 as including a particular quantity and arrangement of components, in some implementations, network 200 may include additional components, fewer components, different components, or differently arranged components. Also, in some instances, one of the devices illustrated in FIG. 2 may perform a function described herein as being performed by another one of the devices illustrated in FIG. 2.

Figure 3A:
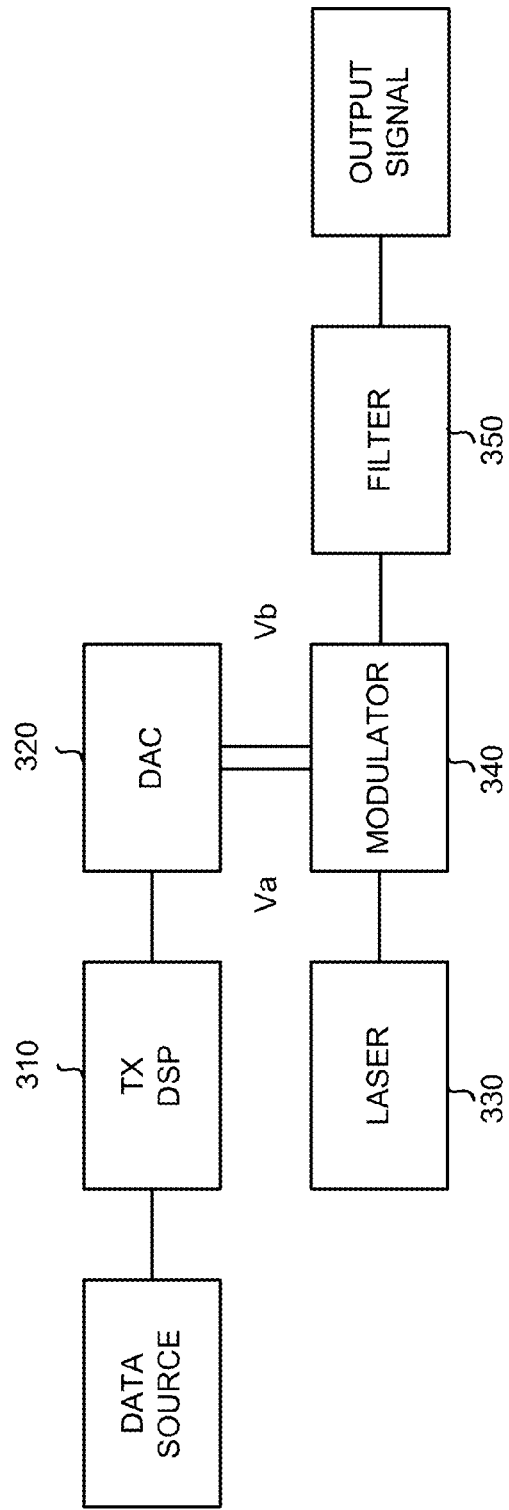
FIG. 3A is a diagram illustrating an example of components of an optical transmitter shown in FIG. 2.

FIG. 3A is a diagram illustrating an example of components of an optical transmitter 212. As shown in FIG. 3A, optical transmitter 212 may include a TX DSP 310, a DAC 320, a laser 330, a modulator 340, and a filter 350. In some implementations, TX DSP 310 and DAC 320 may be implemented on an application specific integrated circuit (ASIC) and/or may be implemented on a single integrated circuit, such as a single PIC. In some implementations, laser 330, modulator 340, and filter 350 may be implemented on a single integrated circuit, such as a single PIC. In some other implementations, TX DSP 310, DAC 320, laser 330, modulator 340, and/or filter 350 may be implemented on one or more integrated circuits, such as one or more ASICs and/or PICs. For example, in some example implementations, components of multiple optical transmitters 212 may be implemented on a single integrated circuit, such as a single PIC, to form a super-channel transmitter.

TX DSP 310 may include a digital signal processor. TX DSP 310 may receive input data from a data source, and determine the voltage signals to apply to modulator 340 to achieve the desired optical signal. TX DSP 310 may map the input data to output symbols, and calculate pre-distorted electrical signals needed to apply to modulator 340. TX DSP 310 may calculate symbols and define the trajectory between symbols. TX DSP 310 may calculate output samples at a rate higher than the symbol rate.

In some example implementations, TX DSP 310 may convert the input data from logical values to constellation points, such as QPSK, 16-QAM, etc. on the complex plane. TX DSP 310 may determine a pulse shape that defines the transitions between the constellation points. TX DSP 310 may, at a particular sample rate higher than the baud rate, calculate the desired electric field envelope of the optical signal. For a super-channel application, TX DSP 310 may choose a pulse shape that gives good spectral efficiency, such as raised-cosine pulse shapes. This pulse shape allows channels to be placed relatively close together across an allocated optical frequency range.

TX DSP 310 may, with knowledge of the non-linear transfer function of modulator 340, calculate the voltage signals needed to produce the desired electric field envelope. An ideal transfer function for modulator 340 may be represented by an equation, such as:

$$E\_out = E\_in * 0.5 * (\exp(lj*Va*pi/Vpi) + \exp(lj*Vb*pi/Vpi)),$$

where E_in refers to a value corresponding to the input electric field (e.g., of the light from laser 330); Va refers to a value of the voltage applied to one waveguide of modulator 340; pi is a constant approximately equal to 3.14159 rad; Vpi is a value of a voltage required to change the phase of the light in modulator 340 by pi radians; and Vb is a value of the voltage applied to another waveguide of modulator 340. In some implementations, E_in may be a constant, such as one (1). This non-linear equation can be inverted analytically, or solved by using a look-up table that maps from electric field to the two voltages: Va and Vb. TX DSP 310 may generate the appropriate integers (e.g., by solving the equation or by using a look-up table) to supply to DAC 320 for DAC 320 to generate the voltage signals (e.g., voltages Va and Vb) to apply to modulator 340.

DAC 320 may include a digital-to-analog converter. In some implementations, DAC 320 may include a high-speed digital-to-analog converter, such as a digital-to-analog converter operating at speeds of 64 GSample/s or higher. DAC 320 may receive the sequence of integers and, based on the sequence of integers, generate voltage signals to apply to modulator 340.

Laser 330 may include a semiconductor laser, such as a distributed feedback (DFB) laser, or some other type of laser. Laser 330 may output light to modulator 340. In some implementations, laser 330 may output light directly to modulator 340. In some implementations, laser 330 may output light to modulator 340 via one or more other components, such as a splitter.

Modulator 340 may include a dual-drive Mach-Zehnder modulator (MZM). As opposed to a traditional nested MZM, a dual-drive MZM has a substantially non-linear transfer function from applied electrical signal to output optical signal. Modulator 340 may receive the light from laser 330 and the voltage signals from DAC 320, and may modulate the light, based on the voltage signals, to generate an optical signal. Due to the non-linear nature of modulator 340, some unwanted distortion may be produced. The distortion may include distortion within an optical frequency band of the optical signal to be sent and may include distortion outside of the optical frequency band. The first type of distortion may be processed on a receiver end, such as by receiver module 220. The second type of distortion may be processed by filter 350. The amount of distortion may depend on parameters, such as a sample rate of DAC 320, a shape of filter 350 (e.g., bandwidth and roll-off), and knowledge of the non-linear transfer function of modulator 340.

Filter 350 may include a filter that reduces or eliminates the unwanted distortion produced by modulator 340. In some implementations, filter 350 may take the form of an arrayed waveguide grating (AWG). In some implementations, filter 350 may take the form of a grating filter. Filter 350 may receive the modulated light from modulator 340, pass the optical signal in the desired optical frequency band, and reject optical signals outside of the desired optical frequency band. Filter 350 may output the optical signal for transmission on a fiber, such as link 230.

While FIG. 3A shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, modulators 340, and/or filters 350 may be selected to implement an optical transmitter 212 with the desired characteristics. In some instances, one of the components illustrated in FIG. 3A may perform a function described herein as being performed by another one of the components illustrated in FIG. 3A.

Figure 3B:
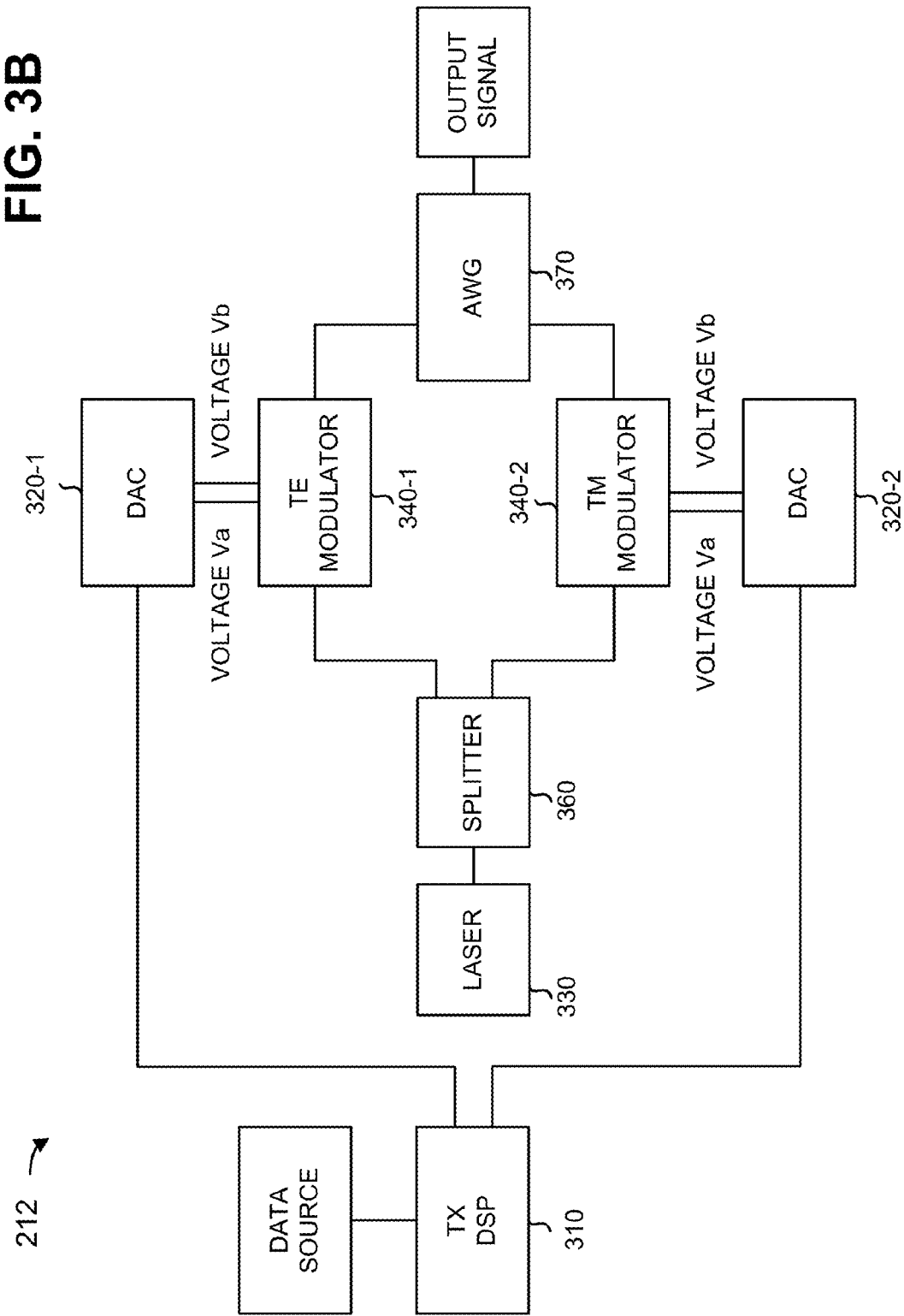
FIG. 3B is a diagram illustrating another example of components of an optical transmitter shown in FIG. 2.

FIG. 3B is a diagram illustrating another example of components of an optical transmitter 212. As shown in FIG. 3B, optical transmitter 212 may include a TX DSP 310, DACs 320-1 and 320-2 (referred to generally as DACs 320 and individually as DAC 320), a laser 330, modulators 340-1 and 340-2 (referred to generally as modulators 340 and individually as modulator 340), splitter 360, and AWG 370. TX DSP 310, DACs 320, laser 330, and modulators 340 may correspond to like components described with regard to FIG. 3A.

Splitter 360 may include an optical splitter that receives the light from laser 330 and splits the light into two portions: one for the first polarization and one for second polarization. In some implementations, the two portions of light may have approximately equal power. Splitter 350 may output one portion of light to modulator 340-1 and another portion of light to modulator 340-2.

Modulator 340-1 may be used to modulate signals having the first polarization. Modulator 340-2 may be used to modulate signals having the second polarization. In some implementations, DAC 320-1 may be associated with the first polarization, and DAC 320-2 may be associated with the second polarization. In these implementations, DAC 320-1 may supply voltage signals to modulator 340-1, and DAC 320-2 may supply voltage signals to modulator 340-2.

AWG 370 may include an arrayed waveguide grating or another type of optical combiner. AWG 370 may receive optical signals from modulators 340 and combine the optical signals to produce an output signal. In some implementations, AWG 370 may also perform filtering on the optical signals to reduce or eliminate the unwanted distortion produced by modulators 340.

While FIG. 3B shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, modulators 340, splitters 360, and/or AWGs 370 may be selected to implement an optical transmitter 212 with the desired characteristics. In some instances, one of the components illustrated in FIG. 3B may perform a function described herein as being performed by another one of the components illustrated in FIG. 3B.

Figure 3C:
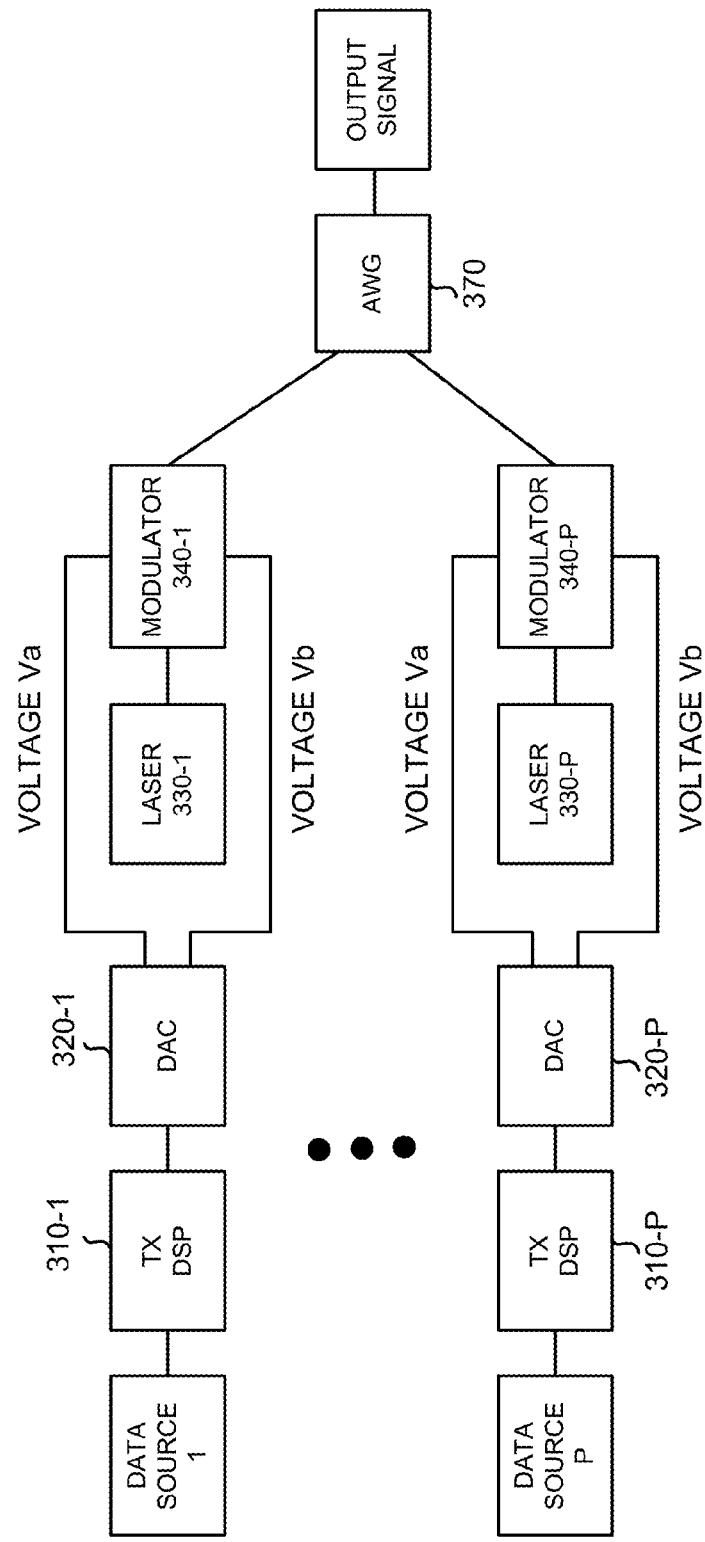
FIG. 3C is a diagram illustrating yet another example of components of an optical transmitter shown in FIG. 2.

FIG. 3C is a diagram illustrating yet another example of components of an optical transmitter 212. As shown in FIG. 3C, optical transmitter 212 may include TX DSPs 310-1 through 310-P (P>1) (referred to generally as TX DSPs 310 and individually as TX DSP 310), DACs 320-1 through 320-P (referred to generally as DACs 320 and individually as DAC 320), lasers 330-1 through 330-P (referred to generally as lasers 330 and individually as laser 330), modulators 340-1 through 340-P (referred to generally as modulators 340 and individually as modulator 340), and AWG 370. TX DSPs 310, DACs 320, lasers 330, and modulators 340 may correspond to like components described with regard to FIG. 3A. AWG 370 may correspond to AWG 370 described with regard to FIG. 3B.

In the arrangement of FIG. 3C, optical transmitter 212 may include multiple TX DSPs 310 that each receives input data from a respective data source. As described above with regard to FIG. 3A, each TX DSP 310 may receive input data from a data source, and determine the voltage signals to apply to modulator 340 to achieve the desired optical signal. Each DAC 320 may generate the voltage signals and apply the voltage signals to a corresponding modulator 340. Each modulator 340 may receive light from a corresponding laser 330 and the voltage signals from a corresponding DAC 320, and may modulate the light based on the voltage signals to produce an optical signal. AWG 370 may receive the optical signals from modulators 340 and may combine the optical signals to produce an output signal for transmission on an optical fiber, such as link 230. In some implementations, AWG 370 may also perform filtering on the optical signals to reduce or eliminate the unwanted distortion produced by modulators 340.

While FIG. 3C shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, modulators 340, and/or AWGs 370 may be selected to implement an optical transmitter 212 with the desired characteristics. In some instances, one of the components illustrated in FIG. 3C may perform a function described herein as being performed by another one of the components illustrated in FIG. 3C.

Figure 3D:
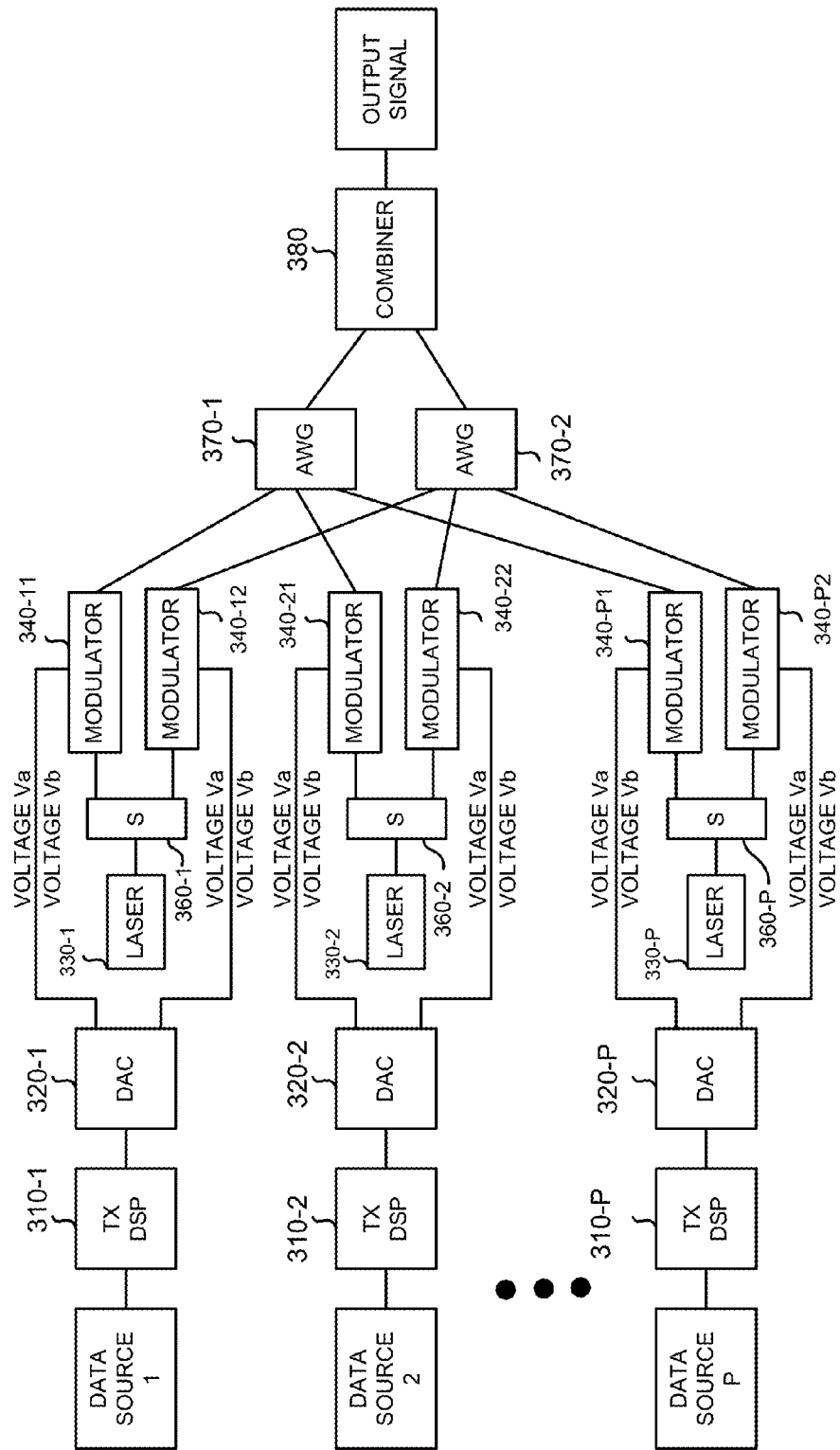
FIG. 3D is a diagram illustrating a further example of components of an optical transmitter shown in FIG. 2.

FIG. 3D is a diagram illustrating a further example of components of an optical transmitter 212. As shown in FIG. 3D, optical transmitter 212 may include a TX DSPs 310-1 through 310-P (referred to generally as TX DSPs 310 and individually as TX DSP 310), DACs 320-1 through 320-P (referred to generally as DACs 320 and individually as DAC 320), lasers 330-1 through 330-P (referred to generally as lasers 330 and individually as laser 330), modulators 340-11 through 340-P2 (referred to generally as modulators 340 and individually as modulator 340), splitters 360-1 through 360-P (referred to generally as splitters 360 and individually as splitter 360), AWGs 370-1 and 370-2 (referred to generally as AWGs 370 and individually as AWG 370), and combiner 380. TX DSPs 310, DACs 320, lasers 330, and modulators 340 may correspond to like components described with regard to FIG. 3A. Splitters 360 may correspond to splitter 360 described with regard to FIG. 3B. AWGs 370 may correspond to AWG 370 described with regard to FIG. 3C.

Combiner 380 may include an optical combiner, such as a polarization beam combiner. Combiner 380 may receive the output signals from AWGs 370 and combine the output signals to produce an output signal for transmission on an optical fiber, such as link 230.

In this particular implementation, each pair of modulators 340 (e.g., modulators 340-11 and 340-12, modulators 340-21 and 340-22, and modulators 340-P1 and 340-P2) may modulate signals having different polarizations. For example, modulators 340-11, 340-21, through 340-P1 may be used to modulate signals having the first polarization. Modulators 340-12, 340-22, through 340-P2 may be used to modulate signals having the second polarization. In some implementations, a DAC 320 may produce voltage signals for both the first polarization and the second polarization, or each DAC 320 may represent multiple DACs that each may produce voltage signals for a particular polarization but not both polarizations.

In some implementations, AWG 370-1 may combine optical signals having the first polarization, and AWG 370-2 may combine optical signals having the second polarization. AWG 370-1 may produce a combined optical signal having the first polarization, and AWG 370-2 may produce a combined optical signal having the second polarization. Combiner 380 may receive and combine these combined optical signals to produce an output signal for transmission on an optical fiber, such as line 230.

While FIG. 3D shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, modulators 340, splitters 360, AWGs 370, and combiners 380 may be selected to implement an optical transmitter 212 with the desired characteristics. In some instances, one of the components illustrated in FIG. 3D may perform a function described herein as being performed by another one of the components illustrated in FIG. 3D.

Figure 4:
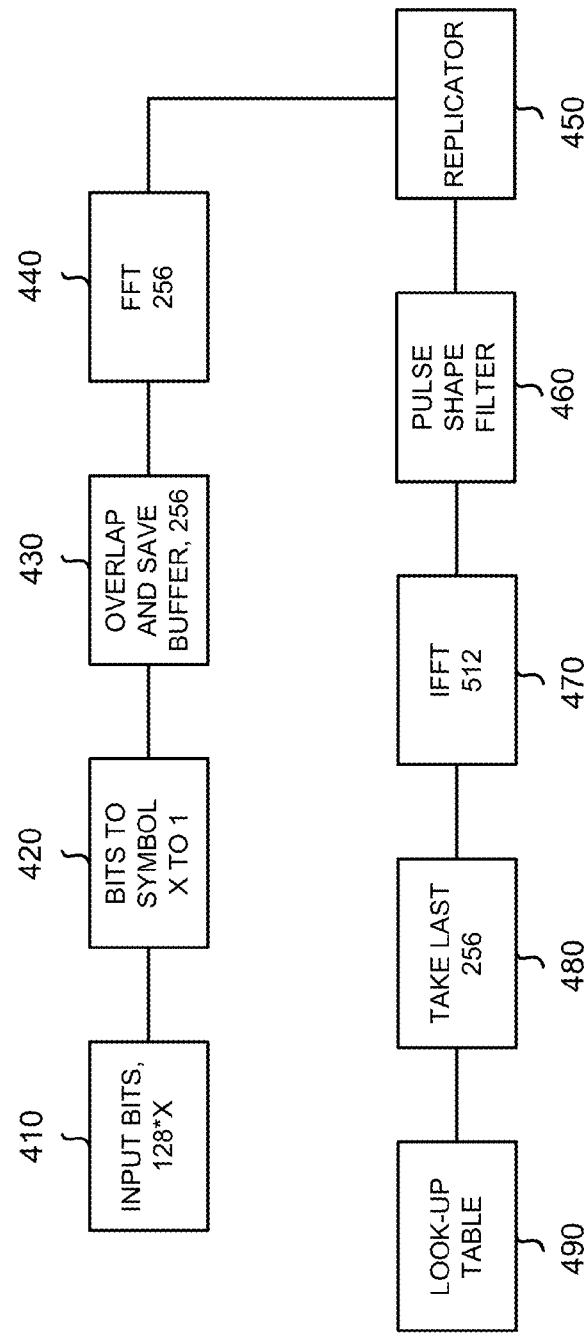
FIG. 4 is a diagram illustrating example functional components of a transmitter digital signal processor shown in FIG. 3A, 3B, 3C, or 3D.

FIG. 4 is a diagram illustrating example functional components of TX DSP 310. The particular functional components, which may be included in TX DSP 310, may vary based on desired performance characteristics and/or computational complexity.

As shown in FIG. 4, TX DSP 310 may include an input bits component 410, a bits to symbol component 420, an overlap and save buffer 430, a fast Fourier transfer (FFT) component 440, a replicator component 450, a pulse shape filter 460, an inverse FFT (IFFT) component 470, a take last 256 component 480, and a look-up table component 490.

Input bits component 410 may process 128*X bits at a time of the input data, where X is an integer. For dual-polarization Quadrature Phase Shift Keying (QPSK), X would be four. Bits to symbol component 420 may map the bits to symbols on the complex plane. For example, bits to symbol component 420 may map four bits to a symbol in the dual-polarization QPSK constellation. Overlap and save buffer 430 may buffer 256 symbols. Overlap and save buffer 430 may receive 128 symbols at a time from bits to symbol component 420. Thus, overlap and save buffer 430 may combine 128 new symbols, from bits to symbol component 420, with the previous 128 symbols received from bits to symbol component 420.

FFT component 440 may receive 256 symbols from overlap and save buffer 430, and may convert the symbols to the frequency domain using, for example, a fast Fourier transform (FFT). FFT component 440 may form 256 frequency bins as a result of performing the FFT. Replicator component 450 may replicate the 256 frequency bins to form 512 frequency bins. This replication may increase the sample rate.

Pulse shape filter 460 may apply a pulse shaping filter to the 512 frequency bins. The purpose of pulse shape filter 460 is to calculate the transitions between the symbols and the desired spectrum so that channels can be packed together on a super-channel. Pulse shape filter 460 may also be used to introduce timing skew between the channels to correct for timing skew induced by link 230.

IFFT component 470 may receive the 512 frequency bins and return the signal back to the time domain, which may now be at the operating speed of DAC 320. IFFT component 470 may convert the signal to the time domain using, for example, an inverse fast Fourier transform (IFFT). Take last 256 component 480 may select the last 256 samples from IFFT component 470. Look-up table 490 may include a table that identifies the integers to supply to DAC 320 based on the samples from take last 256 component 480. In one example implementation, look-up table 490 may include electrical field values and associated Va and Vb voltage signals. Look-up table 490 may use the samples to identify and output the appropriate integers. As explained above, DAC 320 may generate voltage signals based on the integers from TX DSP 310.

While FIG. 4 shows TX DSP 310 as including a particular quantity and arrangement of functional components, in some implementations, TX DSP 310 may include additional functional components, fewer functional components, different functional components, or differently arranged functional components.

Figure 5:
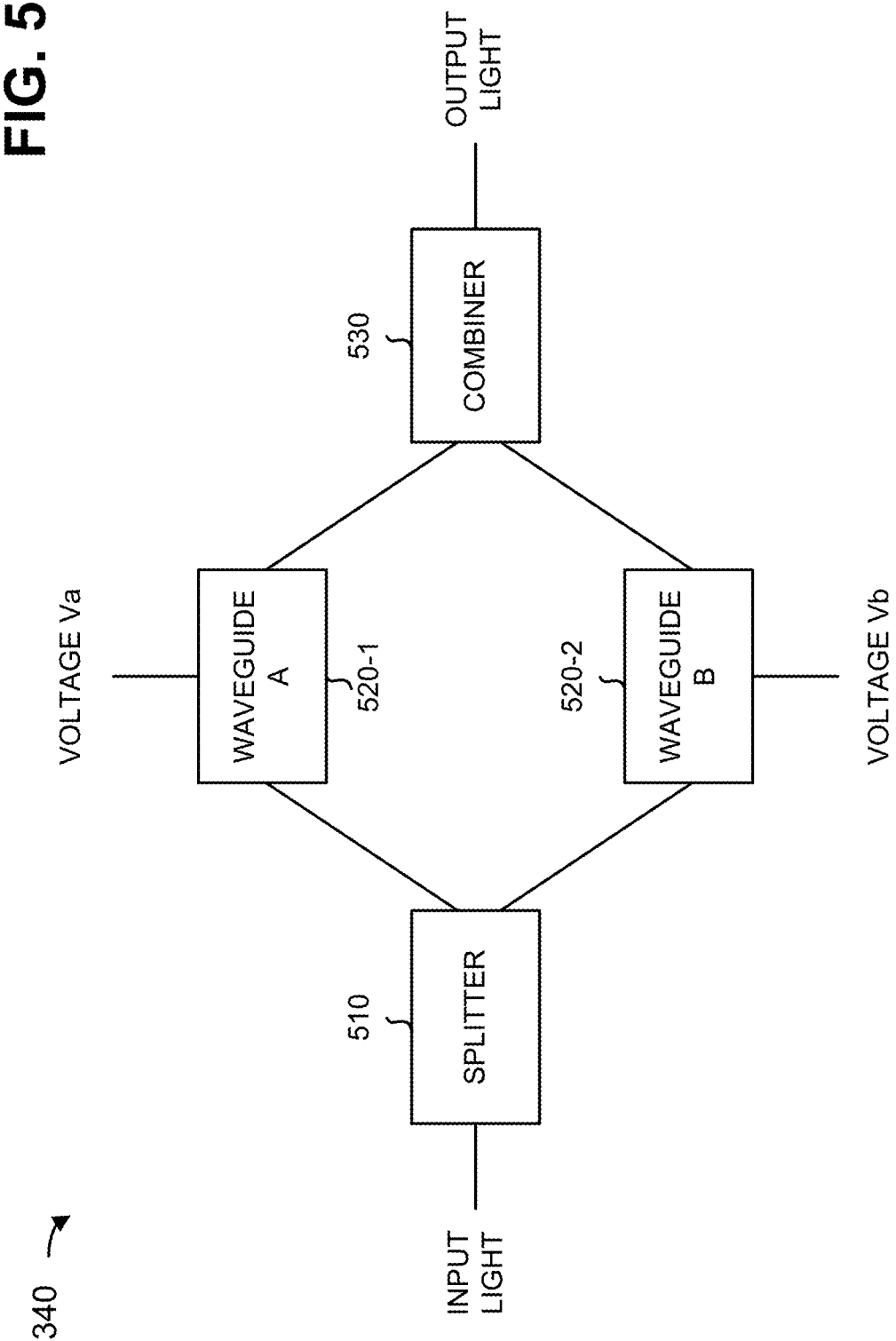
FIG. 5 is a diagram illustrating example components of a modulator shown in FIG. 3A, 3B, 3C, or 3D.

FIG. 5 is a diagram illustrating example components of modulator 340. As shown in FIG. 5, modulator 340 may include a splitter 510, multiple waveguides 520-1 and 520-2 (shown as waveguide A and waveguide B, respectively), and a combiner 530.

Splitter 510 may include an optical splitter that receives input light from laser 330 and splits the light into first and second portions of the light. In some implementations, the first and second portions of light may have approximately equal power. In some other implementations, the first and second portions of light may have unequal power. Splitter 510 may output the first portion of light to waveguide 520-1 and the second portion of light to waveguide 520-2.

Waveguide 520-1 may modulate the first portion of light based on voltage Va from DAC 320. Applying voltage Va to waveguide 520-1 may impart a phase modulation to the first portion of the light to produce a first optical signal. Due to the non-linear nature of modulator 340, waveguide 520-1 may produce some unwanted distortion in addition to the first optical signal.

Waveguide 520-2 may modulate the second portion of light based on voltage Vb from DAC 320. Applying voltage Vb to waveguide 520-2 may impart a phase modulation to the second portion of the light to produce a second optical signal. Due to the non-linear nature of modulator 340, waveguide 520-2 may produce some unwanted distortion in addition to the second optical signal.

Combiner 530 may include an optical combiner or another type of optical multiplexing device. Combiner 530 may receive the first and second optical signals from waveguides 520-1 and 520-2, and combine the first and second optical signals to produce output light. In some implementations, combiner 530 may include some filtering properties to remove unwanted signals that exist outside of the desired optical frequency band.

While FIG. 5 shows modulator 340 as including a particular quantity and arrangement of components, in some implementations, modulator 340 may include additional components, fewer components, different components, or differently arranged components. Also, in some instances, one of the components illustrated in FIG. 5 may perform a function described herein as being performed by another one of the components illustrated in FIG. 5.

Figures 6, 7:
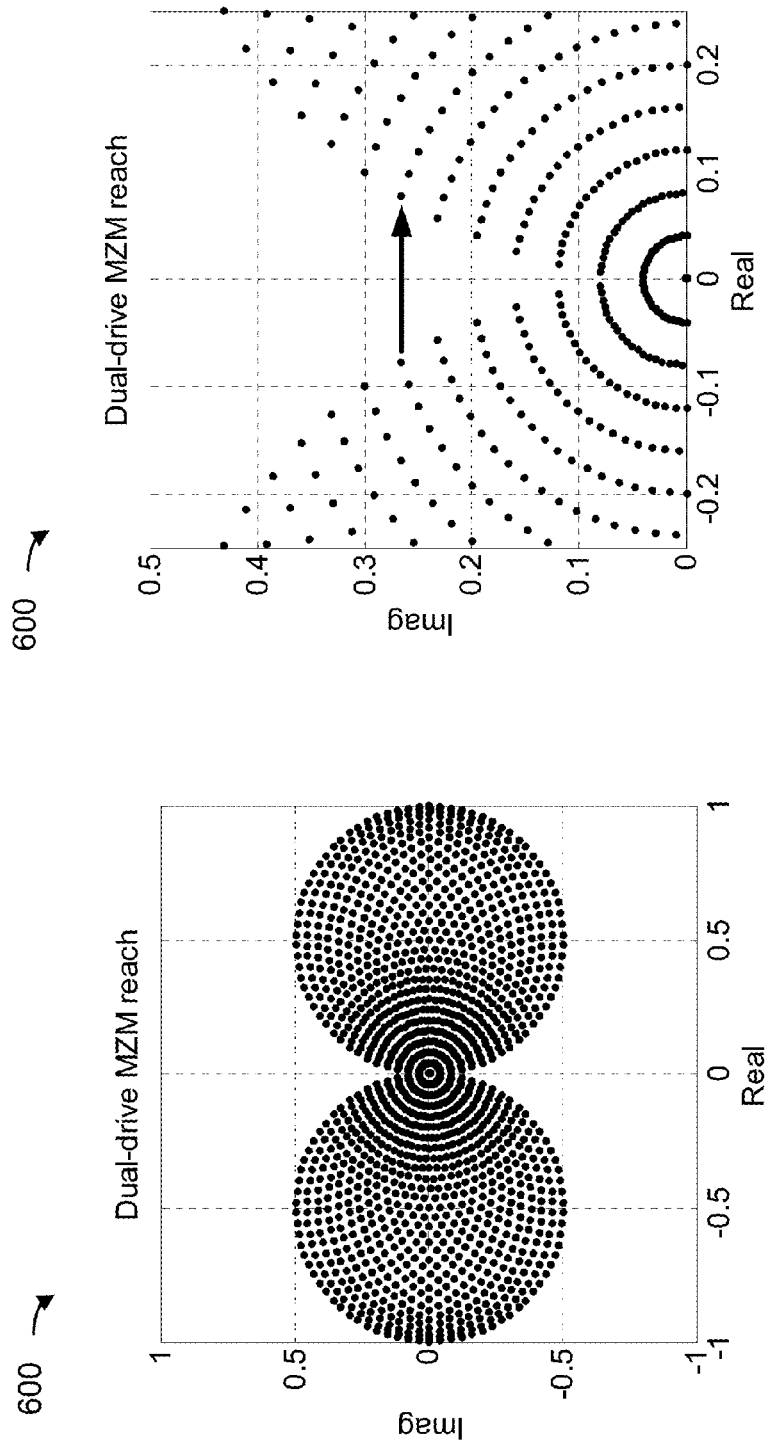
FIG. 6 illustrates an example of a graph showing an accessible portion of the complex plane.
FIG. 7 is a close-up view of a portion of the graph of FIG. 6.

FIG. 6 shows an example of a graph 600 illustrating the accessible portion of the complex plane. Graph 600 shows sample voltage ranges for Va of −1 to +1 and for Vb of −1 to +1. Graph 600 shows examples of electrical fields for various values of Va and Vb within the voltage ranges. Graph 600 may correspond to a visual representation of look-up table 490 of TX DSP 310.

Every point, in graph 600, may represent the output electrical field, and for that output electrical field, there is a corresponding Va and Vb pair. For example, for the constellation point at +j0.5 and +0.5, there are some voltages Va and Vb that correspond to that constellation point. Closer to the origin point of j0 and 0, there are some missing constellation points that cannot be reached, such as at the constellation point at j0 and +0.25, as shown in FIG. 7. In this case, a closest constellation point may be selected. This may cause distortion because the desired constellation point is missing. Some transitions from one constellation point to another (e.g., transitioning from the constellation point at +j0.25 and −0.08 to the constellation point at −j0.25 and +0.08, as shown in FIG. 7) may also cause distortion as the transition passes through the origin point of j0 and 0. As explained above, the distortion may be reduced or eliminated by filter 350.

FIG. 8 shows an example of a graph 800 illustrating an accessible portion of the complex plane compared to the portion that it would be desirable to reach. As shown by graph 800, portion A corresponds to the constellation points that are part of the accessible portion of the complex plane (as shown in FIG. 6), and portion B corresponds to the constellation points that it would be desirable to reach. The overlapping region, of portions A and B, is shown in FIG. 9.

Figure 10:
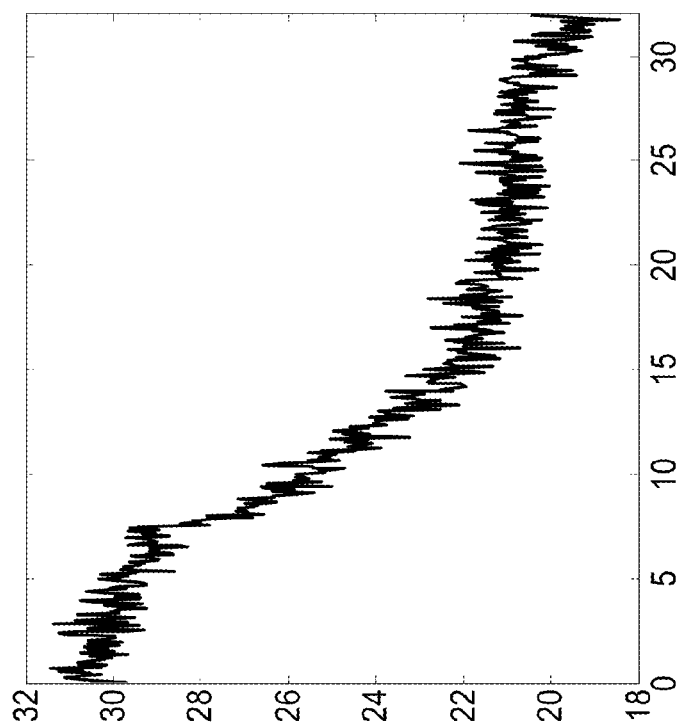
FIG. 10 shows an example of a graph illustrating power spectral density versus frequency.
Figure 11:
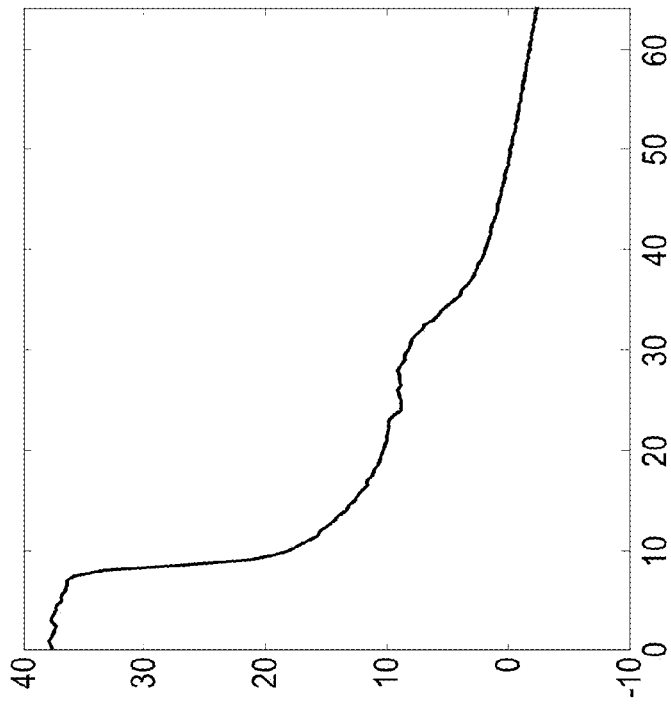
FIG. 11 shows an example of another graph illustrating power spectral density versus frequency.

FIG. 10 shows an example of a graph 1000 illustrating power spectral density versus frequency at the output of DAC 320. Graph 1000 shows an example of voltage signals, which may be output by DAC 320, and the power spectrum of those voltage signals. FIG. 11 shows an example of a graph 1100 illustrating power spectral density versus frequency at the output of modulator 340. Graph 1100 shows an example of optical signals, which may be output by modulator 340, and the power spectrum of those optical signals. As shown by graph 1100, the channel exists between approximately 0 and 8 GHz and distortion exists around 32 GHz.

Figure 12:
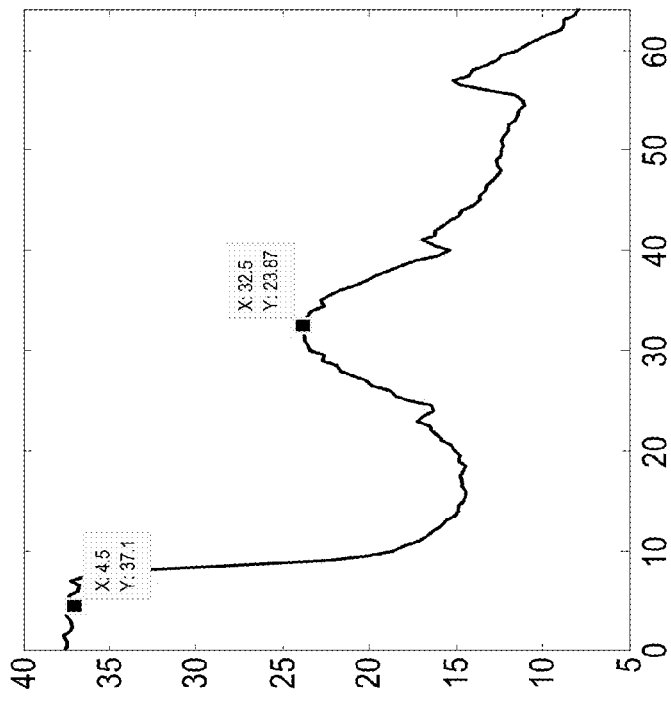
FIG. 12 shows an example of yet another graph illustrating power spectral density versus frequency.
Figure 13:
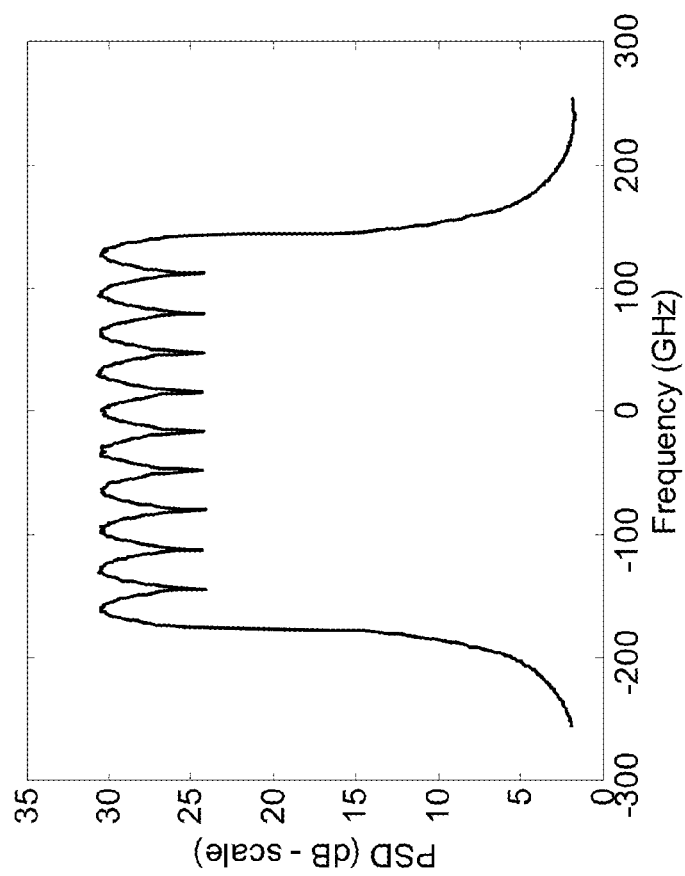
FIG. 13 shows an example of a further graph illustrating power spectral density versus frequency.

FIG. 12 shows an example of a graph 1200 illustrating power spectral density versus frequency at the output of filter 350. Graph 1200 shows an example of optical signals, which may be output by filter 350, and the power spectrum of those optical signals. As shown by graph 1200, the distortion that existed around 32 GHz has been reduced and/or eliminated. As a result, multiple channels can be packed together without distortion. FIG. 13 shows an example of a graph 1300 illustrating power spectral density versus frequency. Graph 1300 shows how several channels can be packed together.

Figure 14:
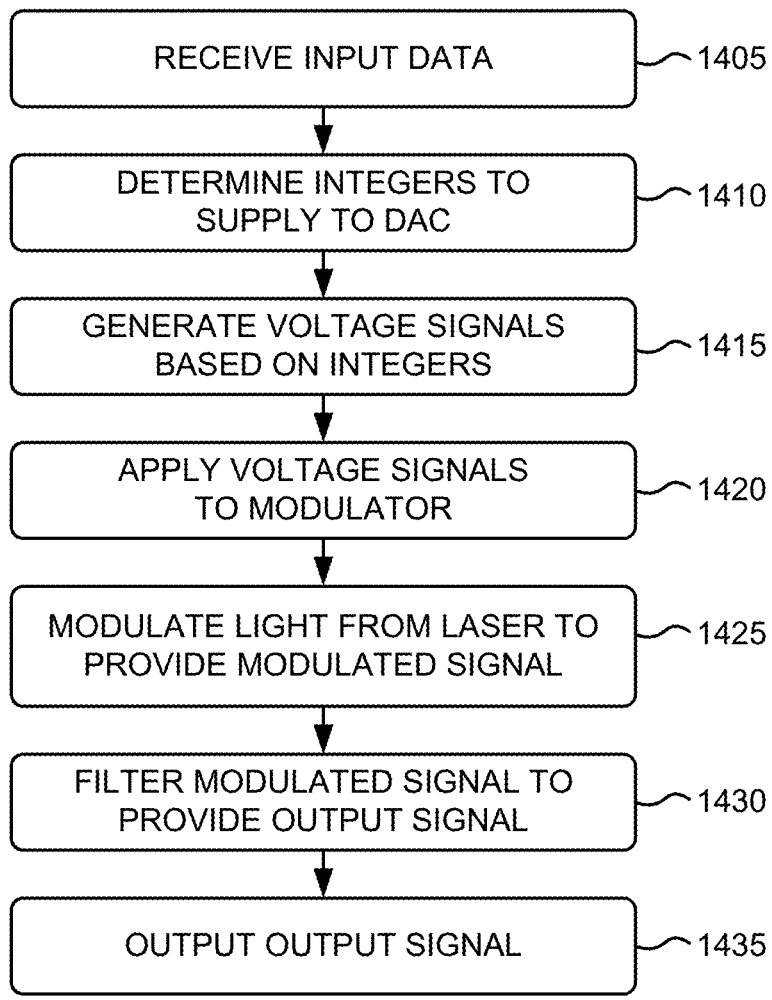
FIG. 14 is a flowchart of an example process that may be performed by an optical transmitter module of FIG. 2.

FIG. 14 is a flowchart of an example process 1400 that may be performed by transmitter module 210. Process 1400 will be described with corresponding references to FIG. 3A.

Process 1400 may include receiving input data (block 1405). For example, TX DSP 310 may receive input data from a data source, such as an integrated circuit, a circuit board connector, or a back-plane connector. The data source may output one or more streams of data, which may be processed by TX DSP 310.

Process 1400 may include determining the integers to supply to the DAC (block 1410). For example, TX DSP 310 may determine the signals to apply to modulator 340 to generate the desired optical signal. TX DSP 310 may receive the input data, and using an FFT, an IFFT, and/or a look-up table, determine a sequence of integers to supply to DAC 320. In some implementations, TX DSP 310 may apply forward error correction to the input data. In some implementations, TX DSP 310 may apply timing skew to compensate for timing skew introduced in link 230.

Process 1400 may include generating voltage signals based on the integers (block 1415) and applying the voltage signals to the modulator (block 1420). For example, DAC 320 may receive the sequence of integers and, based on the sequence of integers, generate the voltage signals to apply to modulator 340 using digital-to-analog conversion. DAC 320 may apply the voltage signals to modulator 340.

Process 1400 may include modulating light from a laser to provide a modulated signal (block 1425). For example, modulator 340 may receive light from laser 330 and the voltage signals from DAC 320, and may modulate the light to provide a modulated signal. As explained above, modulator 340 may produce distortion in addition to the modulated signal due to the non-linear transfer function of modulator 340.

Process 1400 may include filtering the modulated signal to provide an output signal (block 1430), and outputting the output signal (block 1435). For example, filter 350 may receive the modulated signal from modulator 340 and may filter the modulated signal to reduce or eliminate the distortion produced by modulator 340 and to leave a filtered output signal. Filter 350 may output the output signal for transmission on an optical fiber, such as link 230.

While FIG. 14 shows process 1400 as including a particular quantity and arrangement of blocks, in some implementations, process 1400 may include fewer blocks, additional blocks, or a different arrangement of blocks. Additionally, or alternatively, some of the blocks may be performed in parallel.

Figure 15:
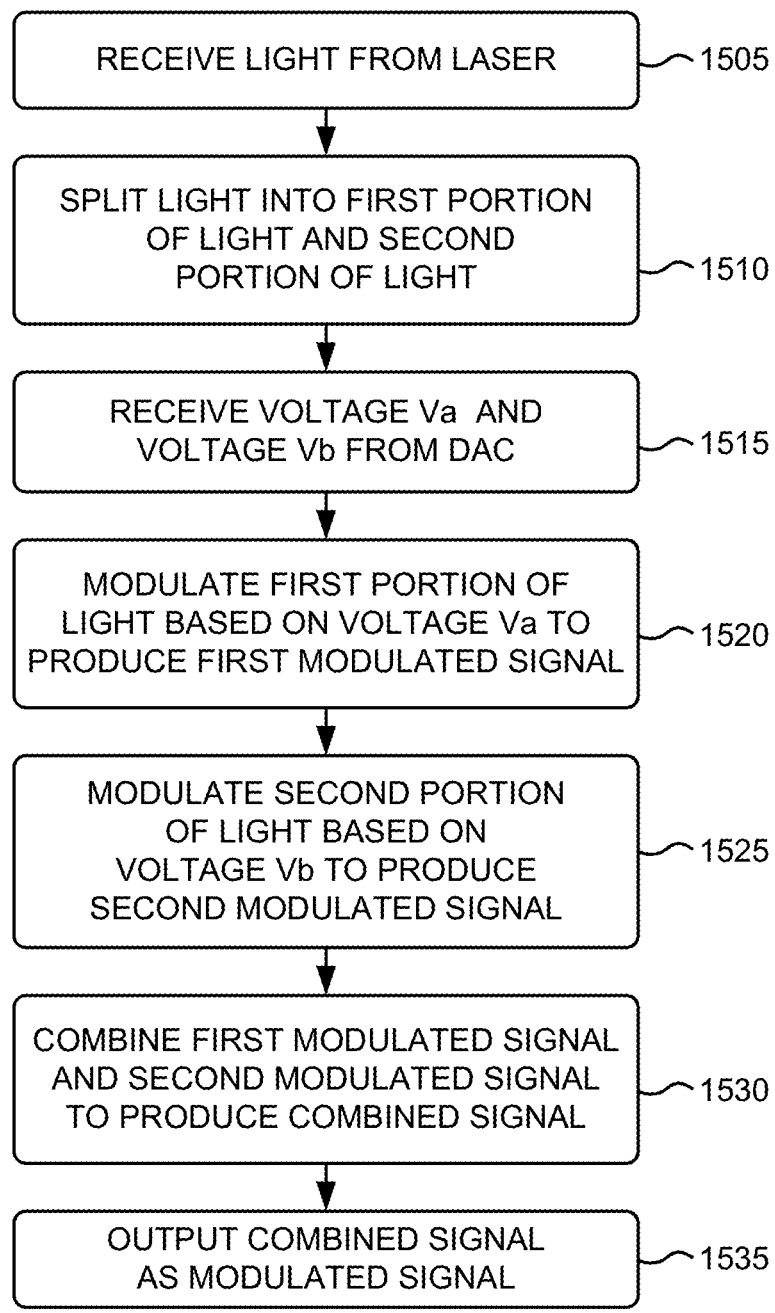
FIG. 15 is a flowchart of an example process that may be performed by a modulator of FIG. 3A, 3B, 3C, or 3D.

FIG. 15 is a flowchart of an example process 1500 that may be performed by modulator 340. In some implementations, process 1500 may correspond to block 1425 of process 1400 of FIG. 14. Process 1500 will be described with corresponding references to FIG. 5.

Process 1500 may include receiving light from a laser (block 1505) and splitting the light into a first portion of light and a second portion of light (block 1510). For example, splitter 510 may receive light from laser 310 and split the light into first and second portions of light. In some implementations, splitter 510 may split the light so that the first and second portions of light have approximately equal power. In some other implementations, splitter 510 may split the light so that the first and second portions have an unequal amount of power. Splitter 510 may output the first portion of light to waveguide 520-1 and the second portion of light to waveguide 520-2.

Process 1500 may include receiving voltage Va and voltage Vb from DAC 320 (block 1515), modulating the first portion of light based on voltage Va to produce a first modulated signal (block 1520), and modulating the second portion of light based on voltage Vb to produce a second modulated signal (block 1525). Waveguide 520-1 may modulate the first portion of light based on voltage Va from DAC 320. As explained above, waveguide 520-1 may modulate the first portion of the light to produce a first modulated signal. Due to the non-linear nature of modulator 340, waveguide 520-1 may produce some unwanted distortion in addition to the first modulated signal. Waveguide 520-2 may modulate the second portion of light based on voltage Vb from DAC 320. As explained above, waveguide 520-2 may modulate the second portion of the light to produce a second modulated signal. Due to the non-linear nature of modulator 340, waveguide 520-2 may produce some unwanted distortion in addition to the second modulated signal.

Process 1500 may include combining the first modulated signal and the second modulated signal to provide a combined signal (block 1530), and outputting the combined signal as a modulated signal (block 1535). For example, combiner 530 may receive the first and second modulated signals from waveguides 520-1 and 520-2, and combine the first and second optical signals to produce a combined signal. Combiner 530 may output the combined signal as a modulated signal.

While FIG. 15 shows process 1500 as including a particular quantity and arrangement of blocks, in some implementations, process 1500 may include fewer blocks, additional blocks, or a different arrangement of blocks. Additionally, or alternatively, some of the blocks may be performed in parallel.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system, comprising:
   a transmitter module comprising:
   a processor configured to:
   receive input data, and
   determine input values corresponding to the input data;
   a digital-to-analog converter configured to:
   receive the input values from the processor, and
   generate first and second voltage signals based on the input values;
   a laser configured to output light;
   a Mach-Zehnder modulator configured to:
   receive the light from the laser and the first and second voltage signals from the digital-to-analog converter, and
   modulate the light based on the first and second voltage signals to generate a modulated optical signal that includes distortion; and
   a filter configured to:
   receive the modulated optical signal from the modulator,
   process the modulated optical signal to reduce or eliminate the distortion and produce an output optical signal, and
   output the output optical signal, where the digital-to-analog converter is a first digital-to-analog converter, the first digital-to-analog converter being configured to:
receive a first set of the input values from the processor, and
generate the first and second voltage signals based on the first set of input values,
the transmitter module further comprising:
a second digital-to-analog converter configured to:
receive a second set of the input values from the processor, and
generate third and fourth voltage signals based on the second set of the input values, where the modulator is a first modulator, the first modulator being configured to:
receive a first portion of the light from the laser and the first and second voltage signals from the first digital-to-analog converter, and
modulate the first portion of the light based on the first and second voltage signals to produce a first modulated optical signal;
the transmitter module further comprising:
a second modulator configured to:
receive a second portion of the light from the laser and the third and fourth voltage signals from the second digital-to-analog converter, and
modulate the second portion of the light based on the third and fourth voltage signals to produce a second modulated optical signal,
where the transmitter module further comprises:
a combiner configured to:
receive the first modulated optical signal and the second modulated optical signal, and
combine the first modulated optical signal and the second modulated optical signal to produce the output optical signal, and
where the combiner is further configured to reduce or eliminate the distortion from the first modulated optical signal or the second modulated optical signal.

2. The optical system of claim 1, where the modulator includes:
a splitter configured to:
receive the light from the laser, and
split the light into a first portion of light and a second portion of light;
a first waveguide configured to:
receive the first portion of the light and the first voltage signal, and
modulate the first portion of the light based on the first voltage signal to produce a first modulated signal with first distortion;
a second waveguide configured to:
receive the second portion of the light and the second voltage signal, and
modulate the second portion of the light based on the second voltage signal to produce a second modulated signal with second distortion; and
a combiner configured to:
receive the first modulated signal and the second modulated signal,
combine the first modulated signal and the second modulated signal to produce the modulated optical signal, and
output the modulated optical signal.

3. The optical system of claim 1, where the processor, when determining the input values, is configured to:
convert the input data to symbols at a first rate,
apply a pulse shape calculation to the symbols, and
calculate, after applying the pulse shape calculation to the symbols, the input values at a second rate, the second rate being greater than or equal to the first rate.

4. The optical system of claim 1, where the processor is further configured to:
convert the input data to constellation points on a complex plane, and
determine a pulse shape that defines transitions between the constellation points.

5. The optical system of claim 1, where the transmitter module further comprises:
a splitter configured to:
receive the light from the laser,
split the light into the first portion of the light and the second portion of the light,
output the first portion of the light to the first modulator, and
output the second portion of the light to the second modulator.

6. The optical system of claim 1, where the first modulated optical signal has a first polarization and the second modulated optical signal has a second polarization, the second polarization being substantially orthogonal with respect to the first polarization.

7. An optical system comprising:
a transmitter module comprising:
a processor configured to:
receive input data, and
determine input values corresponding to the input data;
a digital-to-analog converter configured to:
receive the input values from the processor, and
generate first and second voltage signals based on the input values;
a laser configured to output light;
a Mach-Zehnder modulator configured to:
receive the light from the laser and the first and second voltage signals from the digital-to-analog converter, and
modulate the light based on the first and second voltage signals to generate a modulated optical signal that includes distortion; and
a filter configured to:
receive the modulated optical signal from the modulator,
process the modulated optical signal to reduce or eliminate the distortion and produce an output optical signal, and
output the output optical signal,
where the processor is one of a plurality of processors, each of the plurality of processors being configured to:
receive respective input data, and
determine respective input values corresponding to the respective input data,
where the digital-to-analog converter is one of a plurality of digital-to-analog converters, each of the plurality of digital-to-analog converters being configured to:
receive the respective input values from a corresponding one of the plurality of processors, and
generate respective first and second voltage signals based on the respective input values,
where the laser is one of a plurality of lasers configured to output light,
where the modulator is one of a plurality of first modulators or one of a plurality of second modulators, each of the plurality of first modulators being configured to:

receive the respective light from a corresponding first one of the plurality of lasers and the respective first and second voltage signals from a corresponding first one of the plurality of digital-to-analog converters, and modulate the respective light, from the corresponding first one of the plurality of lasers, based on the respective first and second voltage signals, from the corresponding first one of the plurality of digital-to-analog converters, to produce a first modulated optical signal;

each of the plurality of second modulators being configured to:

receive the respective light from a corresponding second one of the plurality of lasers and the respective first and second voltage signals from a corresponding second one of the plurality of digital-to-analog converters, and modulate the respective light, from the corresponding second one of the plurality of lasers, based on the respective first and second voltage signals, from the corresponding second one of the plurality of digital-to-analog converters, to produce a second modulated optical signal, and where the transmitter module further comprises:

a first arrayed waveguide grating configured to:
receive the first modulated optical signals, and
combine the first modulated optical signals to produce a first combined optical signal;

a second arrayed waveguide grating configured to:
receive the second modulated optical signals, and
combine the second modulated optical signals to produce a second combined optical signal; and a combiner configured to:
receive the first combined optical signal and the second combined optical signal, and
combine the first combined optical signal and the second combined optical signal to provide the output optical signal.

8. The optical system of claim 7, where the transmitter module further comprises:

a combiner configured to:
receive the first modulated optical signals and the second modulated optical signals, and
combine the first modulated optical signals and the second modulated optical signals to provide the output optical signal.

9. A transmitter module, comprising:
a plurality of transmitter components configured to produce a plurality of first modulated signals and a plurality of second modulated signals;
a first combiner configured to receive the plurality of first modulated signals and combine the plurality of first modulated signals into a first combined signal;
a second combiner configured to receive the plurality of second modulated signals and combine the plurality of second modulated signals into a second combined signal; and
a third combiner configured to combine the first combined signal and the second combined signal into an output optical signal and output the output optical signal, one of the plurality of transmitter components including:
a processor configured to:
receive input data, and
determine a first set of input values and a second set of input values corresponding to the input data;
a first digital-to-analog converter configured to:
receive the first set of input values from the processor, and
generate first and second voltage signals based on the first set of input values;
a second digital-to-analog converter configured to:
receive the second set of input values from the processor, and
generate third and fourth voltage signals based on the second set of input values;
a first Mach-Zehnder modulator configured to:
receive first light and the first and voltage signals from the first digital-to-analog converter, and
modulate the first light based on the first and second voltage signals to produce one of the plurality of first modulated signals that includes distortion; and
a second Mach-Zehnder modulator configured to:
receive second light and the third and fourth voltage signals from the second digital-to-analog converter, and
modulate the second light based on the third and fourth voltage signals to produce one of the plurality of second modulated signals that includes distortion;
the first combiner being further configured to reduce or eliminate the distortion from the one of the plurality of first modulated signals;
the second combiner being further configured to reduce or eliminate the distortion from the one of the plurality of second modulated signals.

10. The transmitter module of claim 9, where the plurality of first modulated signals have a first polarization, and the plurality of second modulated signals have a second polarization, the second polarization being substantially orthogonal with respect to the first polarization.

11. The transmitter module of claim 9, where the one of the plurality of transmitter components further includes:
a laser configured to output light; and
a splitter configured to:
receive the light from the laser,
split the light into the first light and the second light,
output the first light to the first modulator, and
output the second light to the second modulator.

12. The transmitter module of claim 9, where the processor is further configured to:
apply forward error correction to the input data to provide forward error correction encoded data, or
apply timing skew to the input data to provide timing-skewed data.

* * * * *